United States Patent
Dai et al.

(10) Patent No.: US 11,870,774 B2
(45) Date of Patent: Jan. 9, 2024

(54) METHOD AND SYSTEM FOR AUTHENTICATION DATA TRANSMISSION

(71) Applicant: REALTEK SEMICONDUCTOR CORP., Hsinchu (TW)

(72) Inventors: Hong-Hai Dai, Suzhou (CN); Yang Li, Suzhou (CN); Dong-Yu He, Suzhou (CN); Jiayuan Tan, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 332 days.

(21) Appl. No.: 17/316,962

(22) Filed: May 11, 2021

(65) Prior Publication Data
US 2022/0014414 A1    Jan. 13, 2022

(30) Foreign Application Priority Data
Jul. 7, 2020    (CN) .......................... 202010643930.4

(51) Int. Cl.
*H04L 9/40*    (2022.01)
*G06F 21/32*   (2013.01)

(52) U.S. Cl.
CPC .......... *H04L 63/0861* (2013.01); *G06F 21/32* (2013.01); *H04L 63/0428* (2013.01); *H04L 63/166* (2013.01)

(58) Field of Classification Search
CPC ............. G06F 21/32; G06F 2221/2141; G06F 2221/2103; G06F 2221/2133; G06V 40/45
USPC ........................................................ 713/186
See application file for complete search history.

(56) References Cited

U.S. PATENT DOCUMENTS

| | | | |
|---|---|---|---|
| 7,765,408 B1 * | 7/2010 | Geosimonian | G06F 21/32 726/28 |
| 9,646,150 B2 * | 5/2017 | Toth | G06F 21/45 |
| 9,712,524 B2 * | 7/2017 | Chang | H04W 12/068 |
| 10,333,707 B1 * | 6/2019 | Pathak | H04L 63/061 |
| 10,756,906 B2 * | 8/2020 | Toth | H04L 9/0894 |
| 10,984,270 B2 * | 4/2021 | Storm | G06V 40/167 |
| 11,093,772 B2 * | 8/2021 | Hamid | G06V 40/172 |
| 11,205,021 B2 * | 12/2021 | Kalenderidis | G06F 21/32 |
| 11,595,210 B2 * | 2/2023 | Hoang | G06N 3/082 |

(Continued)

FOREIGN PATENT DOCUMENTS

| | | |
|---|---|---|
| CN | 108064376 A | 5/2018 |
| CN | 111226450 A | 6/2020 |

*Primary Examiner* — Amare F Tabor
(74) *Attorney, Agent, or Firm* — Li & Cai Intellectual Property (USA) Office

(57) ABSTRACT

A method for authentication data transmission and a system thereof are provided. The method is operated in a computer system that is connected to a biometric device, and a secure channel is established there-between according to a security protocol. The computer system can receive encrypted biometric feature data from the biometric device based on a request. In a secure environment built in the computer system, the biometric feature data is decrypted and biometric features can be extracted. A comparison result is generated after comparing the biometric features with feature data in a database. The comparison result can be transmitted to the biometric device. The comparison result is then encrypted in the biometric device according to the security protocol. The biometric device can therefore transmit the encrypted comparison result to the computer system via the secure channel.

14 Claims, 4 Drawing Sheets

(56) References Cited

U.S. PATENT DOCUMENTS

2019/0087554 A1* 3/2019 Fish ................ H04M 1/724631
2021/0367786 A1* 11/2021 Sheets ................... H04W 12/02

* cited by examiner

METHOD AND SYSTEM FOR AUTHENTICATION DATA TRANSMISSION

CROSS-REFERENCE TO RELATED PATENT APPLICATION

This application claims the benefit of priority to China Patent Application No. 202010643930.4, filed on Jul. 7, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for transmitting authentication data, and more particularly to a method operated in a computer system for transmitting an authentication data in compliance with a security transmission protocol and a system thereof

BACKGROUND OF THE DISCLOSURE

A secure login measure can be provided for a user to log in a computer system. In addition to the traditional login method using the user's username and password, a login system of the computer system may require a more secure login method such as using biometrics. The secure login measure can prevent an unauthorized user or a malicious program from illegally logging in the computer system. The biometric technology can ensure that the user logging in the computer system is authorized to do so.

For security purposes, Microsoft Corporation has developed a secure device connection protocol (SDCP) that allows an operating system to accept biometric technology as a secure channel for login authentication. The secure channel based on the SDCP can effectively prevent external malicious programs from invading the computer system.

Nevertheless, a design of the conventional biometric system is subject to many restrictions for being only compatible with devices that have a match on chip (MOC), such that it can be supported by the SDCP provided by Microsoft Corporation.

SUMMARY OF THE DISCLOSURE

For allowing a match on host (MOH) based biometric device to be applicable to an authentication environment under a security protocol, a method for authentication data transmission and a system thereof are provided in the present disclosure. Through a newly designed secure channel, the system allows the security protocol that does not originally support match on host technology to accept the related authentication procedure.

According to one embodiment of the method for authentication data transmission in the disclosure, the method is operated in a computer system that connects with a biometric device. In the method, the computer system connects with the biometric device via a specific connection protocol. A secure channel is established under a security protocol between the computer system and the biometric device.

When the computer system performs a procedure that requires biometric identification, a request for authentication is issued to the biometric device first. The biometric device is configured to acquire a user's biometric feature data. The biometric feature data is encrypted and sent to the computer system. The computer system receives the encrypted biometric feature data from the biometric device. Afterwards, in a secure environment, the biometric feature data is decrypted. Biometric features can be extracted from the biometric feature data, and the biometric features are compared with the feature data in a database. A comparison result is accordingly generated.

Next, the computer system transmits the comparison result to the biometric device. In the biometric device, the comparison result is encrypted according to the security protocol and transmitted to the computer system via the secure channel based on the security protocol. In particular, the process for transmitting the encrypted comparison result is already in compliance with the security protocol that is dedicated to support a match on chip (MOC) technology.

Preferably, the biometric device is implemented by a match on host technology that uses a sensor to collect biometric features and a processing circuit that forms the biometric feature data after the biometric features are collected by the sensor.

In an aspect of the disclosure, the computer system connects with a processing circuit of the biometric device via a driver interface. The computer system receives the biometric feature data from the processing circuit via the driver interface, and also transmits the comparison result to the processing circuit via the same driver interface.

Further, the secure environment is established by a software procedure performed by a processor of the computer system. The procedures such as decryption, extraction of biometric features and comparison with the biometric features can be performed in the secure environment. The comparison result is therefore generated.

In one further aspect of the disclosure, the security protocol can be the secure device connection protocol announced by Microsoft® Corp. The secure channel is a first secure channel established under the secure device connection protocol.

Further, when the computer system receives the comparison result via the secure channel, the computer system stops to access the biometric device after the comparison result is confirmed.

In one further embodiment of the disclosure, a system for operating the method for authentication data transmission is provided. The system includes a computer system having a processor and a memory. A database including one or more feature data is established in the computer system. The system also includes a biometric device connected with the computer system. The processor of the computer system performs the method for authentication data transmission.

Thus, when the computer system uses a software-implemented biometric engine to receive the comparison result by the secure device connection protocol, the system implements a MOC-based biometric authentication procedure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
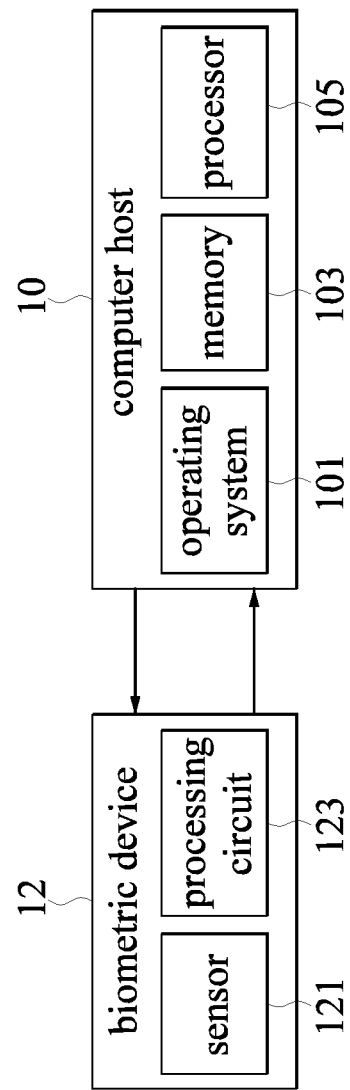
FIG. 1 is a schematic diagram depicting a biometric technology applied in a computer system in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method for authentication data transmission and a system thereof. The method is to solve the deficiency that the traditional MOH (match on host) based biometric technology cannot be used under a specific security protocol. For example, Microsoft Corp. provides a secure device connection protocol (SDCP) that is only applicable to MOC (match on chip) based biometric technology. A processing integrated chip used for the match on chip technology requires a very powerful capability of computation since it needs to process computations of fingerprint recognition and encryption. The method for authentication data transmission of the present disclosure provides a solution with relatively low cost for the match on host biometric technology to be adapted to the specific security protocol, such as the secure device connection protocol (SDCP).

Reference is made to FIG. 1, which is a schematic diagram showing the method for authentication data transmission to be adapted to a biometric technology in a computer system according to one embodiment of the disclosure.

A computer host 10 is shown in the diagram. The computer host 10 essentially includes a processor 105 and a memory 103, and operates an operating system 101. Preferably, the computer system includes a database storing one or more feature data. A biometric device 12 shown in the diagram connects to the computer system via a specific connection means such as a USB or the like. The computer host 10 connects with the biometric device 12 that is preferably a MOH-based device. The biometric device 12 includes a sensor 121 that is used to collect biometric features of a user, and a processing circuit 123 that is used to render the biometric feature data.

It should be noted that the processing circuit 123 is an arithmetic unit for encryption computation. The arithmetic unit can be called a bridge that is used as an encryption circuit in the biometric device. The encryption circuit is used to encrypt a comparison result and/or biometric features to the computer system via a first secure channel so as to be complied with a specific security protocol. This solution allows the MOH-based device to support the specific security protocol, e.g., the secure device connection protocol, for ensuring security of data transmission. In the system of the disclosure, the system allows the MOH technology to be applicable to the security protocol. Therefore, the system allows the chip with lower computing power to be applicable to the security protocol since the computation that is originally operated under the biometric device 12 is transferred to the processor 105 of the computer system. Therefore, the hardware cost can be reduced.

The system of the present disclosure can be used in various biometric technologies such as fingerprint identification, facial recognition, voiceprint recognition, iris recognition, finger vein recognition and palmprint recognition that can be used for the applications requiring high security. The biometric device 12 can collect the biometric features and convert the biometric features to the data which is acceptable to the computer system. For example, the biometric features are converted to the data in compliance with a specific format of a specific security protocol.

Figure 2:
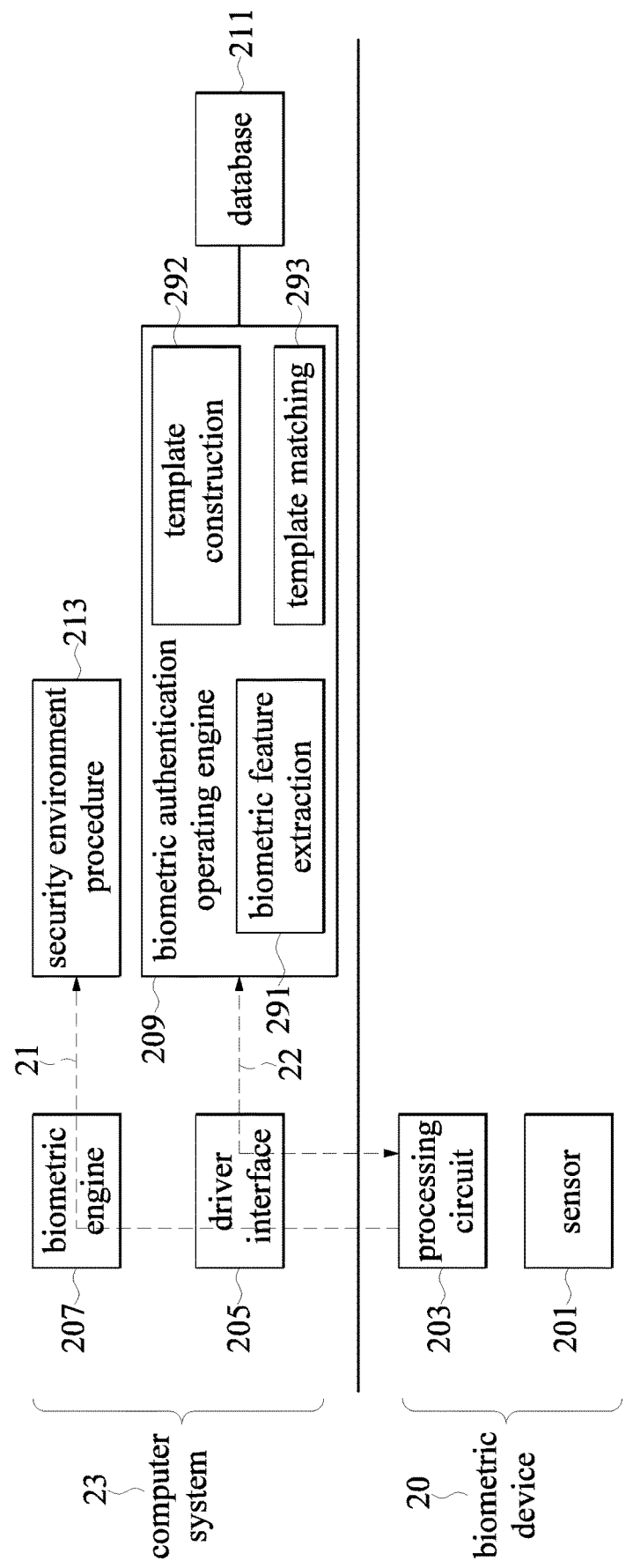
FIG. 2 is a schematic diagram depicting a system framework complying with a specific security protocol and an authentication data transmission procedure operated in the system according to one embodiment of the disclosure.

FIG. 2 is a schematic diagram depicting a system framework complying with a specific security protocol and an authentication data transmission procedure operated in the system according to one embodiment of the disclosure.

The main components of the biometric device 20 include a sensor 201 and a processing circuit 203. Rather than the MOC-based biometric device that requires powerful processing capability for performing the biometric identification process such as biometric feature recognition and authentication, the method for authentication data transmission of the disclosure is more suitable for the MOH-based biometric device 20 with relatively poor hardware capability.

The computer system 23 includes a driver interface 205, a biometric authentication operating engine 209 and a database 211. The computer system 23 establishes a first secure channel 21 and a second secure channel 22 with the processing circuit 203 of the biometric device 20. The database 211 can be a storage device in the computer system 23 or a cloud database used to store the feature data. The data in the database 221 is encrypted by the computer system.

In one embodiment of the disclosure, the first secure channel 21 can be a secure channel that is established in compliance with the secure device connection protocol. Further, the second secure channel 22 can be a secure channel that is established in compliance with a security transmission protocol such as a transport layer security protocol (TLS). Thus, the biometric device 20 performs the method for authentication data transmission, e.g., transmitting the biometric feature data to the computer system 23, receiving the biometric features, performing comparison with the features, and transmitting the comparison result via the first secure channel 21 and the second secure channel 22.

In the present embodiment, the computer system 23 connects to the processing circuit 203 of the biometric device 20 via the driver interface 205. Therefore, the computer system 23 receives the biometric feature data from the processing circuit 203 via the driver interface 205 and also transmits the comparison result and/or the biometric features to the processing circuit 203 via the driver interface 205.

According to the embodiment of the system for authentication data transmission in the disclosure, the computer system 23 implements a biometric authentication operating engine 209 by a software means via a second secure channel 22. One of the objectives of the biometric authentication operating engine 209 is to perform a biometric authentication procedure such as biometric feature extraction 291, template construction 292 and/or template matching 293 under a secure environment. The mentioned secure environment can be configured to be a memory block of the computer system 23 in which an encryption and decryption algorithm is performed. In the secure environment, a security transmission protocol such as the transport layer security protocol (TLS) can be performed. The computer system 23 operates a secure environment by the security transmission protocol. The biometric procedure supporting a specific security protocol is performed in the secure environment, for example, the secure device connection protocol (SDCP) provided by Microsoft Corporation. Thus, the system for authentication data transmission allows the MOH-based biometric device 20 to be operated under the specific security protocol via the second secure channel 22 so as to enhance the security and compatibility of the biometric device 20 under a specific operating environment. For example, if the computer system 23 operates Windows OS, the security protocol can be the SDCP.

For example, when the sensor 201 of the biometric device 20 collects the user's fingerprint, the biometric feature data is generated after the processing circuit 203 processes the fingerprint. The biometric feature data is encrypted and transmitted to the computer system 23. In the computer system 23, the processor performs a software procedure allowing the biometric authentication operating engine 209 to perform decryption, biometric feature extraction, template constitution and comparison. The comparison result is generated after the biometric features are compared with the feature data in the database 211.

On the other hand, the computer system 23 uses another software procedure to implement a biometric engine 207 via the first secure channel 21. The MOC-implemented biometric authentication procedure can be operated in this security environment procedure 213. When the biometric device 20 receives the comparison result, the system allows the computer system 23 to receive the comparison result from the MOH-implemented biometric device 20 by the security protocol, e.g., the secure device connection protocol. Therefore, the MOC-based biometric authentication procedure can be implemented by this approach.

According to one of the solutions provided by the method, the biometric engine 207 can be a windows biometric framework of Microsoft Corp. The main purpose of the biometric engine 207 is to provide an application interface (API) that allows the computer system 23 to retrieve, store and compare the biometric features. In one aspect of the disclosure, the security environment procedure 213 can be a virtualization-based security (VBS) developed by Microsoft® Corp. The VBS is a virtualized security mechanism that is provided to virtualize hardware in order to create a memory block that is to be isolated from other files. In the method for authentication data transmission, the computer system 23 establishes a secure environment via the security environment procedure 213 so as to process the authentication data securely for eliminating threats of malicious intrusion. The authentication data is such as the biometric feature data generated by the biometric device.

Figure 3:
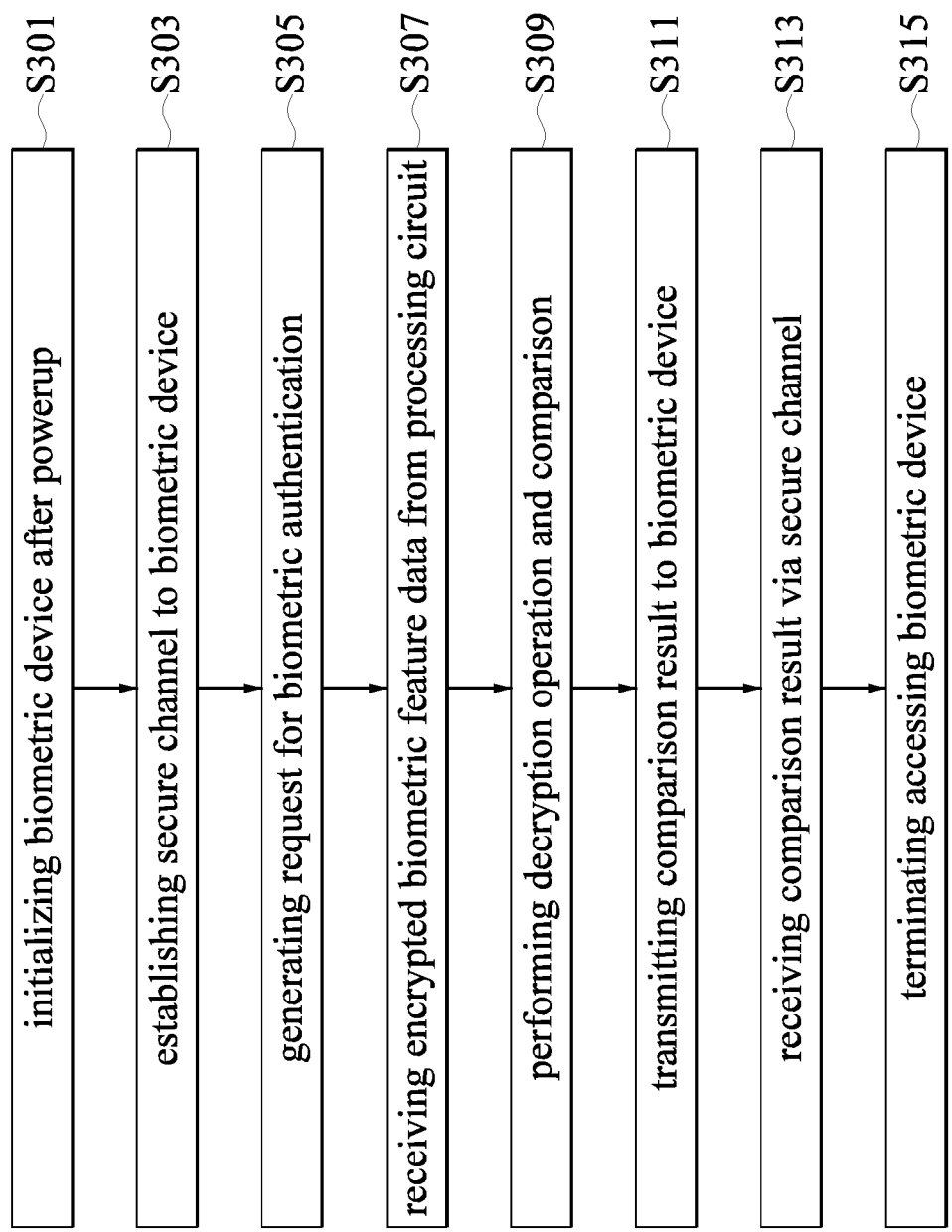
FIG. 3 shows a flow chart describing a method for authentication data transmission in a computer system according to one embodiment of the disclosure.

FIG. 3 shows a flow chart describing the method for authentication data transmission performed by a computer system according to one embodiment of the disclosure. The process begins as the computer system boots and operates an operating system since the computer is powered up. After initializing the biometric device to be connected to the computer system via a specific communication port (step S301), the biometric device can be an external device that is connected to the computer system via a specific connection means or a circuit module installed in the computer system. The sensor and the processing circuit in the biometric device are initialized so as to activate the device to be in standby mode for collecting the biometric features, or to be awakened by the system.

In the computer system, a driver establishes a secure channel to the biometric device according to a security protocol (step S303). In one embodiment of the disclosure, a Windows operating system is taken as an example, the security protocol can be a secure device connection protocol that is used to establish the secure channel, such as the first secure channel and the second secure channel in the above-described embodiments.

When the computer system initiates a computer procedure that requires user identification, the computer system generates a request for authentication to the biometric device (step S305). The computer procedure requiring user identification is such as logging in a system, conducting transaction, making payment, accessing a specific service or a file and performing any process that needs to confirm identity of the user.

When the request for authentication is transmitted to the biometric device, the related procedure running in the computer system regularly accesses the biometric device. In the meantime, the biometric device acquires biometric features such as features of a fingerprint, a face, a voiceprint, an iris or a finger vein. The processing circuit of the biometric device encrypts the biometric features so as to form biometric feature data. The encrypted biometric feature data is transmitted to the computer system via the second secure channel. The second secure channel can be a secure channel that is established under a transport layer security protocol. Thus, when the computer system receives the biometric feature data (step S307), the biometric feature data is decrypted and configured to compare with the feature data in the database in a secure environment (step S309).

A decryption algorithm and a matching algorithm are software procedures performed by a processor of the computer system. The procedures are such as the biometric feature extraction, template construction and template matching process performed by the biometric authentication operating engine shown in FIG. 2. In the secure environment, the biometric feature data is decrypted, biometric features are extracted from the biometric feature data, and the biometric features are compared with the feature data in the database. A comparison result is generated. The computer system transmits the comparison result to the biometric device, for example, via the second secure channel shown in FIG. 2 (step S311). The biometric device receives the comparison result, and encrypts the comparison result with a corresponding algorithm according to the security protocol supported by the biometric device. The other secure channel, such as the first secure channel shown in FIG. 2, is established for transmitting the encrypted comparison result to the computer system (step S313).

The computer system receives the comparison result from the biometric device via the secure channel, e.g., the first secure channel After confirming the comparison result, the user authentication is accomplished. The computer system accordingly allows the user to proceed with a procedure such as logging on the system, unlocking, conducting payment or transaction, accessing a service or a file. The software procedure performed in the computer system then stops accessing the biometric device (step S315). In one further embodiment of the disclosure, such as in step S311, the computer system transmits the comparison result and the biometric features back to the biometric device via the second secure channel The biometric device then receives the comparison result and the biometric features. In step S313, the biometric device encrypts the comparison result and the biometric features with a corresponding algorithm The comparison result and the biometric features are then transmitted to the computer system via the first secure channel In final step S315, the computer system stops accessing the biometric device after confirming the comparison result.

Figure 4:
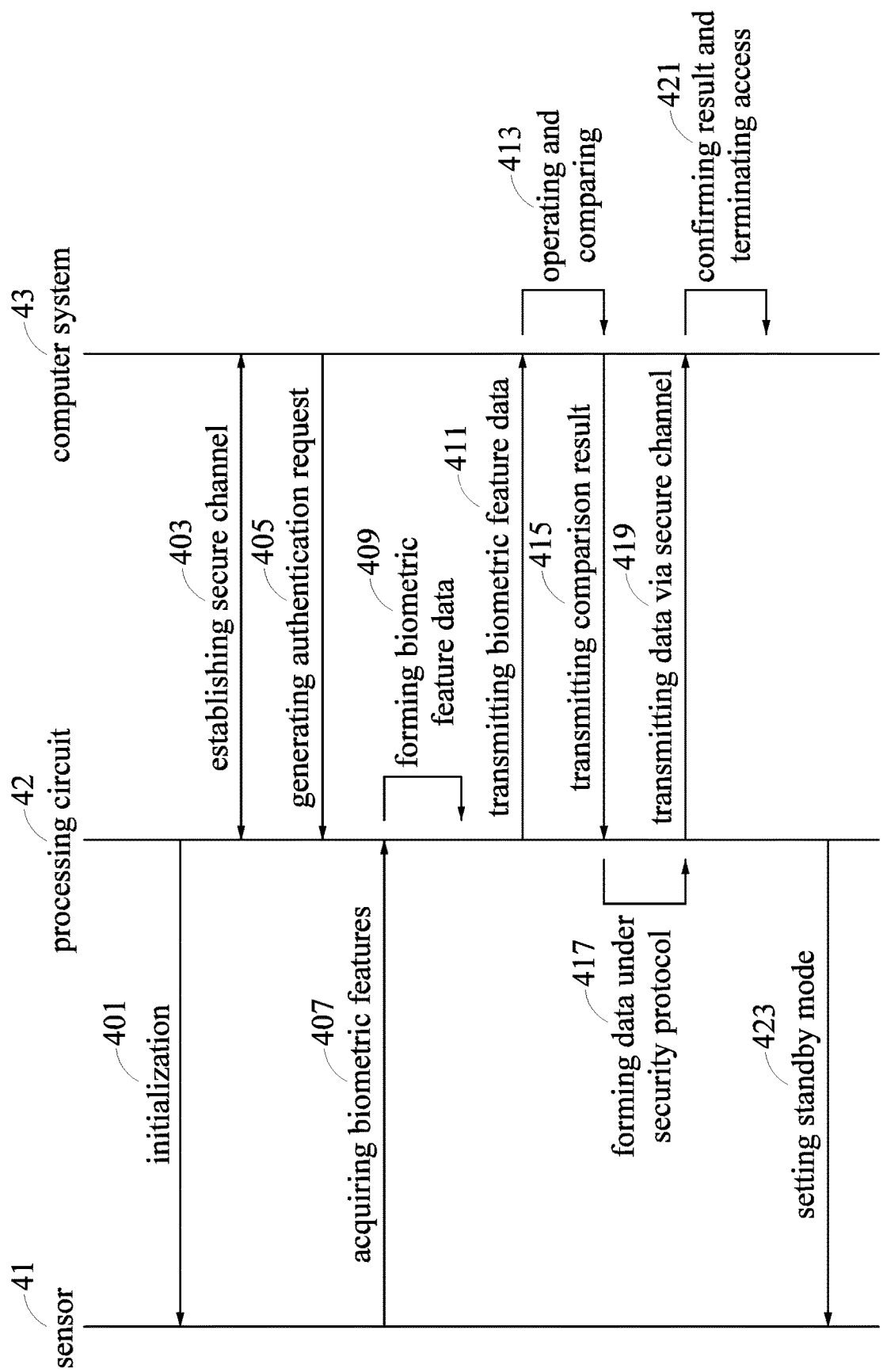
FIG. 4 shows a flow chart which describes the method for authentication data transmission among a biosensor, a biometric features processing device and a computer system according to one embodiment of the disclosure.

FIG. 4 shows a flow chart describing the method for authentication data transmission operated among a biosensor, a biometric features processing device and a computer system according to one embodiment of the disclosure.

The flow chart shows the process for transmitting the authentication data among a sensor 41 and a processing circuit 42 of the biometric device and the computer system 43. When the computer system is turned on, the biometric device connected with the computer system is also powered up. The sensor 41 and the processing circuit 42 are then initialized (step S401). When the computer system 43 completely boots up and enters an operating system, a secure channel in compliance with a security protocol to the processing circuit 42 is established. The secure channel can be the above-mentioned first secure channel and the second secure channel (step S403).

Afterwards, when the computer system initiates a procedure that requires a biometric identification, the operating system operated in the computer system requires an biometric identification so as to generate a request for authentication to the processing circuit 42 (step S405). The processing circuit 42 controls the sensor 41 for collecting biometric features (step S407), such as sensing a user's fingerprint. Biometric feature data is then produced in the processing circuit 42 (step S409). The biometric feature data is encrypted and transmitted to the computer system 43 via a secure channel The secure channel is such as the second secure channel (shown as 22 in FIG. 2) (step S411).

The computer system 43 performs computation and matching in a secure environment (step S413). The procedures performed in the secure environment include feature extraction, template construction and comparing of the feature data in the database. A comparison result is then generated. The comparison result and biometric features are then encrypted and transmitted to the processing circuit 42 via the same secure channel such as the second secure channel (step S415). After the processing circuit 42 of the biometric device receives the comparison result, the comparison result is encrypted under a security protocol to be a data transmitted to the computer system 43 (step S417). In the meantime, the encrypted comparison result is transmitted to the computer system 43 via the first secure channel 21 (step S419).

In the computer system 43, after confirming the comparison result, the computer system 43 stops accessing the biometric device (step S421). In the biometric device, the processing circuit 42 sets the sensor 41 or other relevant circuits to a standby mode that has low energy consumption (step S423).

Thus, the above-described procedures operated among the sensor 41, the processing circuit 42 and the computer system 43 embody the method for authentication data transmission. Through the different secure channels established between the biometric device and the computer system, the MOH-based biometric device can support the security protocol that is originally adapted to MOC biometric technology such as the secure device connection protocol (SDCP).

To sum up, according to the above embodiments of the method for authentication data transmission and the system, the MOH-based biometric technology is able to be operated under a specific security protocol with secure transmission and encryption algorithm The MOH-based biometric device can be used accordingly in the biometric authentication procedure that originally supports the MOC biometric technology. Therefore, the cost can be reduced since the MOH-based biometric technology replaces the technology that is originally used for MOC-based biometric device. Furthermore, the framework provided in the disclosure utilizes computation power of the processor of the computer system to perform calculations in biometrics such as fingerprint authentication. In addition to replacing the operations in a bridge of the MOC biometric device and in compliance with a dedicated security protocol, the computer system can establish a secure environment with a security mechanism so as to guarantee security in data transmission and processing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A method for authentication data transmission, which is operated in a computer system that is connected to a biometric device, the method comprising:
   establishing, by the computer system, a first secure channel and a second secure channel between the biometric device and the computer system via a driver interface in accordance with a first security protocol and a second security protocol, respectively, wherein the first security protocol is a secure device connection protocol, and the second security protocol is a transport layer security protocol;

receiving, via the second secure channel by the computer system, a biometric feature data that is encrypted from the biometric device;

decrypting the biometric feature data and retrieving biometric features from the biometric feature data, and comparing the biometric features with feature data in a database so as to produce a comparison result;

transmitting, by the computer system, the comparison result to the biometric device via the second secure channel; and in the biometric device, encrypting the comparison result according to the first security protocol and transmitting the encrypted comparison result to the computer system via the first secure channels;

wherein the computer system implements a biometric engine by a software procedure, and the biometric engine receives the comparison result via the secure device connection protocol so as to implement a biometric authentication procedure that supports a match on chip technology.

2. The method according to claim 1, wherein the biometric device is implemented by a match on host technology that uses a sensor to collect the biometric features and a processing circuit to form the biometric feature data.

3. The method according to claim 2, wherein the computer system connects to the processing circuit via the driver interface, the driver interface receives the biometric feature data from the processing circuit via the second secure channel, and transmits the comparison result to the processing circuit via the second secure channel.

4. The method according to claim 3, wherein the computer system performs a software procedure by a processor, and decrypts and compares the biometric features in the database in a secure environment so as to generate the comparison result.

5. The method according to claim 1, wherein the computer system generates a request for authentication and transmits the request to the biometric device, and the computer system continually accesses the biometric device that is configured to collect the biometric features and encrypts the biometric features as the biometric feature data.

6. The method according to claim 5, wherein, when the computer system initiates a computer procedure that requires user identification, the computer system generates a request for authentication, transmits the request to the biometric device, and continually accesses the biometric device.

7. The method according to claim 5, wherein, when the computer system receives the comparison result via the first secure channel, the computer system stops accessing the biometric device after confirming the comparison result.

8. A system, in which a method for authentication data transmission is operated, the system comprising:

a computer system, including a processor and a memory, wherein a database including one or more feature data is established; and a biometric device connecting to the computer system;

wherein the processor performs the method for authentication data transmission comprising:

establishing a first secure channel and a second secure channel to the biometric device according to a first security protocol and a second security protocol via a driver interface, respectively, wherein the first security protocol is a secure device connection protocol, and the second security protocol is a transport layer security protocol;

receiving encrypted biometric feature data from the biometric device via the second secure channel;

decrypting the biometric feature data and extracting biometric features from the biometric feature data, wherein the biometric features are used to compare with the feature data in the database so as to generate a comparison result;

transmitting the comparison result to the biometric device via the second secure channel; and in the biometric device, encrypting the comparison result according to the first security protocol and transmitting the encrypted comparison result to the computer system via the first secure channel;

wherein the computer system implements a biometric engine by a software procedure and the biometric engine receives the comparison result via the secure device connection protocol so as to implement a biometric authentication procedure that supports a match on chip technology.

9. The system according to claim 8, wherein the biometric device is implemented by a match on host technology that uses a sensor to collect the biometric features and a processing circuit to form the biometric feature data.

10. The system according to claim 9, wherein the computer system connects to the biometric device via a communication port, the computer system receives the biometric feature data generated from the biometric device via the second secure channel, and transmits the comparison result to the biometric device via the second secure channel.

11. The system according to claim 10, wherein the computer system performs a software procedure by the processor, and decrypts and compares the biometric features in the database in a secure environment so as to generate the comparison result.

12. The system according to claim 8, wherein the biometric device includes an encryption circuit for encrypting the comparison result that is transmitted to the computer system via the first secure channel for complying with the secure device connection protocol.

13. The system according to claim 8, wherein, when the computer system initiates a computer procedure that requires user identification, the computer system generates a request for authentication, transmits the request to the biometric device, and continually accesses the biometric device.

14. The system according to claim 13, wherein, when the computer system receives the comparison result via the first secure channel, the computer system stops accessing the biometric device after confirming the comparison result, and then the biometric device enters a standby mode.

* * * * *